US005923282A

United States Patent [19]

Honma et al.

[11] Patent Number: 5,923,282

[45] Date of Patent: Jul. 13, 1999

[54] RADAR SYSTEM

[75] Inventors: Shinichi Honma; Masahiro Watanabe, both of Tokyo, Japan

[73] Assignee: Mitsubishi Denki Kabushiki Kaisha, Tokyo, Japan

[21] Appl. No.: 09/006,483

[22] Filed: Jan. 13, 1998

[30] Foreign Application Priority Data

Aug. 15, 1997 [JP] Japan .................................. 9-220375

[51] Int. Cl.$^{6}$ .................................................. G01S 13/08

[52] U.S. Cl. .......................................... 342/118; 342/135

[58] Field of Search .................................. 342/118, 128, 342/126, 135, 136

[56] References Cited

U.S. PATENT DOCUMENTS

| | | | |
|---|---|---|---|
| 4,521,778 | 6/1985 | Knepper | 342/134 |
| 4,651,153 | 3/1987 | Norsworthy | 342/110 |
| 4,847,622 | 7/1989 | Maitre et al. | 342/110 |

FOREIGN PATENT DOCUMENTS 0 474 613 A2 11/1992 European Pat. Off. .

OTHER PUBLICATIONS

Radar Techniques, Inst. of Electronics, Information and Communication Engineers of Japan, 1984, pp. 1–2.

*Primary Examiner*—John B. Sotomayor
*Attorney, Agent, or Firm*—Sughrue, Mion, Zinn, Macpeak & Seas, PLLC

[57] ABSTRACT

A radar system capable of identifying discriminatively multiple reflected waves generated between the radar system and a target (6) to thereby identify discriminatively a first echo indicating a real image from a target (6). The system includes a range finding unit (8) for determining arithmetically distance (R) to the target (6), a distance data processing unit (9) for selecting from plural distance data as obtained a set of distance data indicating the distances which bear an integral multiple relation to one another, a detecting unit (10) for comparing reception amplitude levels (Pr) for individual distance data of data sets with a predetermined threshold level (S) to thereby detect a set of distance data having the reception amplitude levels (Pr) exceeding the threshold level (S), and an identifying unit (11) for identifying discriminatively the distance data based on the first echo from the distance data ascribable to the succeeding multiple reflected waves in the distance data set detected.

5 Claims, 6 Drawing Sheets

R
2
7
3
4
6 TARGET
RECEIVER
8
RANGE FINDING UNIT
1B
9A
DISTANCE DATA PROCESSING UNIT
10
12
DETECTING UNIT
DIFFERENTIAL OPERATION UNIT
IDENTIFYING UNIT
11
5
DISPLAY UNIT
RADAR SYSTEM

Pr #1 #2 #3 WHEN $t=t_1$
$R_1$ $R_2$ $R_3$ R

Pr #1 #2 #3 WHEN $t=t_2$
$R_1'$ $R_2'$ $R_3'$ R $$Rn' = \frac{2}{3} Rn,$$

$$\frac{dRn}{dt} = \frac{Rn' - Rn}{t_2 - t_1} = \frac{Rn}{3\Delta t}$$

$$\Delta t = t_2 - t_1$$

Pr : AMPLITUDE LEVEL
R : DISTANCE
S : THRESHOLD LEVEL $S_1$, $S_2$ : THRESHOLD LEVELS

RADAR SYSTEM

BACKGROUND OF THE INVENTION

1. Field of the Invention

The present invention relates generally to a pulse radar system for determining or measuring a distance to an object of concern (hereinafter also referred to as the target) and more particularly to a pulse radar system for measuring a distance to a target located at a relatively short distance from the radar system.

2. Description of Related Art

A typical one of such radar systems is disclosed in Takashi Yoshida: "RADAR TECHNIQUES" published by the Institute of Electronics, Information and Communication Engineers of Japan, (1984), p. 1. For having better understanding of the invention, background techniques thereof will first be reviewed. FIG. 6 is a schematic block diagram illustrating the principle underlying the distance measurement or range finding operation of a conventional pulse radar system.

Referring to FIG. 6, the pulse radar system (hereinafter also referred to as the radar system) generally denoted by reference numeral 1 includes a transmitter 2 equipped with a transmitting antenna 3*a* for sending out radio wave pulses having high intensity and short duration toward a target 6, a receiver 4 equipped with a receiving antenna 3*b* for receiving the echo or radio waves reflected at the target 6, and a signal processor for processing the synchronizing pulse signal supplied from the transmitter 2 upon every sending-out of the radio wave and the output signal from the receiver 4 to thereby arithmetically determine the distance to the target or a relative speed when the radar system and the target are moving relative to each other, angular position of the target or the like which is then displayed on an indicator or a display unit 5 provided at the output side of the signal processor.

The range finding function (i.e., function for measuring the distance to the target) of the radar system will now be considered. When the distance between the radar system 1 and the target 6 is represented by R while representing by T the difference between the time point at which the radio wave was sent out from the transmitting antenna 3*a* and the time point at which echo from the target 6 (i.e., time lapse from the transmission of the radio wave to the reception of the echo) is received by the receiving antenna 3*b*, the following expression (1) can apply valid for the distance R and the time difference T.

$$R=CT/2 \tag{1}$$

where C represents the velocity of light.

Thus, the distance to the target can be arithmetically determined in accordance with the above expression (2) by measuring the time difference, i.e., the time taken for the radio wave transmitted from the radar system to be received by the receiver 4 after reflection at the target. Although the above description is made in conjunction with the pulse radar system, the basic concept underlying the distance measuring or range finding operation of the other type radar systems such as FM-CW radar.

The conventional radar system of the structure described above suffers a problem that when the distance between the radar system 1 and the target 6 is so short that the received signal levels of multiple reflected waves, i.e., radio wave undergone twice or more reflections between the target and the radar system in succession to a first radio wave or echo (hereinafter also referred to as the primary echo) become higher than a minimum reception level set at the receiver 4, then the multiple reflected waves will possibly be recognized or identified as if they originated in other targets, which may of course lead to erroneous detection of the real target, to a serious disadvantage.

SUMMARY OF THE INVENTION

In the light of the state of the art described above, it is an object of the present invention to provide a pulse radar system which is capable of identifying discriminatively a first or primary echo and multiple reflected waves from a target located at a relatively short distance from the radar system, to identify selectively only the first echo for thereby determining the distance to the near target with high accuracy and reliability.

In view of the above and other objects which will become apparent as the description proceeds, there is provided according to a general aspect of the present invention a radar system which includes a range finding means for measuring amplitude levels of received signals upon every reception of reflected waves from a target after transmission of a radio wave toward the target and determining arithmetically individual distances to the target on the basis of times lapsed from transmission of the radio wave to the reception of the reflected waves, to thereby generate distance data indicating relations between the distances and the amplitude levels, respectively, a distance data processing means for extracting from the generated distance data sets a set of distance data indicating the distances which bear an integral multiple relation to one another, a detecting means for comparing the amplitude levels for the individual distance data of the set with a predetermined threshold level to thereby detect distance data each having the amplitude levels exceeding the threshold level, and an identifying means for identifying discriminatively on the basis of the detected distance data a real image indicated by a first echo from the target and false echo images indicated by succeeding multiple reflected waves reflected repeatedly between the transmitting means and the target.

By virtue of the arrangement of the radar system described above, the multiple reflected waves received by the radar system at high reception level upon detection of a near target located at a short distance from the radar system can be identified or detected discriminatively from the first reflected wave or echo, whereby only the first echo from the target can be selected, which in turn contributes to enhancing the accuracy as well as reliability of the range finding operation of the radar system.

In a preferred mode for carrying out the invention, the threshold level may be so set as to be variable in the detecting means.

With the arrangement of the radar system described above, the first echo and the multiple reflected waves from the target located relatively closely to the radar system can be separated from each other with further enhanced accuracy.

In another preferred mode for carrying out the invention, the threshold level of the detecting means may be so set as to be variable in accordance with reception amplitude levels of the preceding distance data detected up to the preceding range finding operation.

With the above arrangement of the radar system, the environmental situations or states in which the radar system is operated can be taken into consideration, whereby the first echo and the multiple reflected waves from the target located relatively closely to the radar system can be separated from each other with further enhanced accuracy.

In yet another preferred mode for carrying out the invention, the threshold level may be so set in the detecting means as to change continuously in correspondence to change of the distance in the distance data set extracted.

The arrangement mentioned above is advantageous in that the first echo and the multiple reflected waves occurring between the radar system and the near target can be separated with high accuracy.

In a further preferred mode for carrying out the invention, the radar system may further be arranged as to include a differential operation means for fetching from the distance data processing means distance data sets at every time point at which the radio wave is transmitted toward the target repetitionally and determining differential coefficients by time differentiation of distances represented by the distance data, and an identifying means for identifying discriminatively those of the differential coefficients which are in proportion to the distances, respectively, as distance data based on the first echo and the multiple reflected waves from a same target.

With the arrangement of the radar system described above, the temporal information concerning the time taken for the radar wave to travel between the radar system and the targets is taken into consideration, whereby the individual targets can be identified distinctly with high accuracy on the basis of the distance data acquired from a plurality of targets, which data may include those of the multiple reflections as well.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Figure 1:
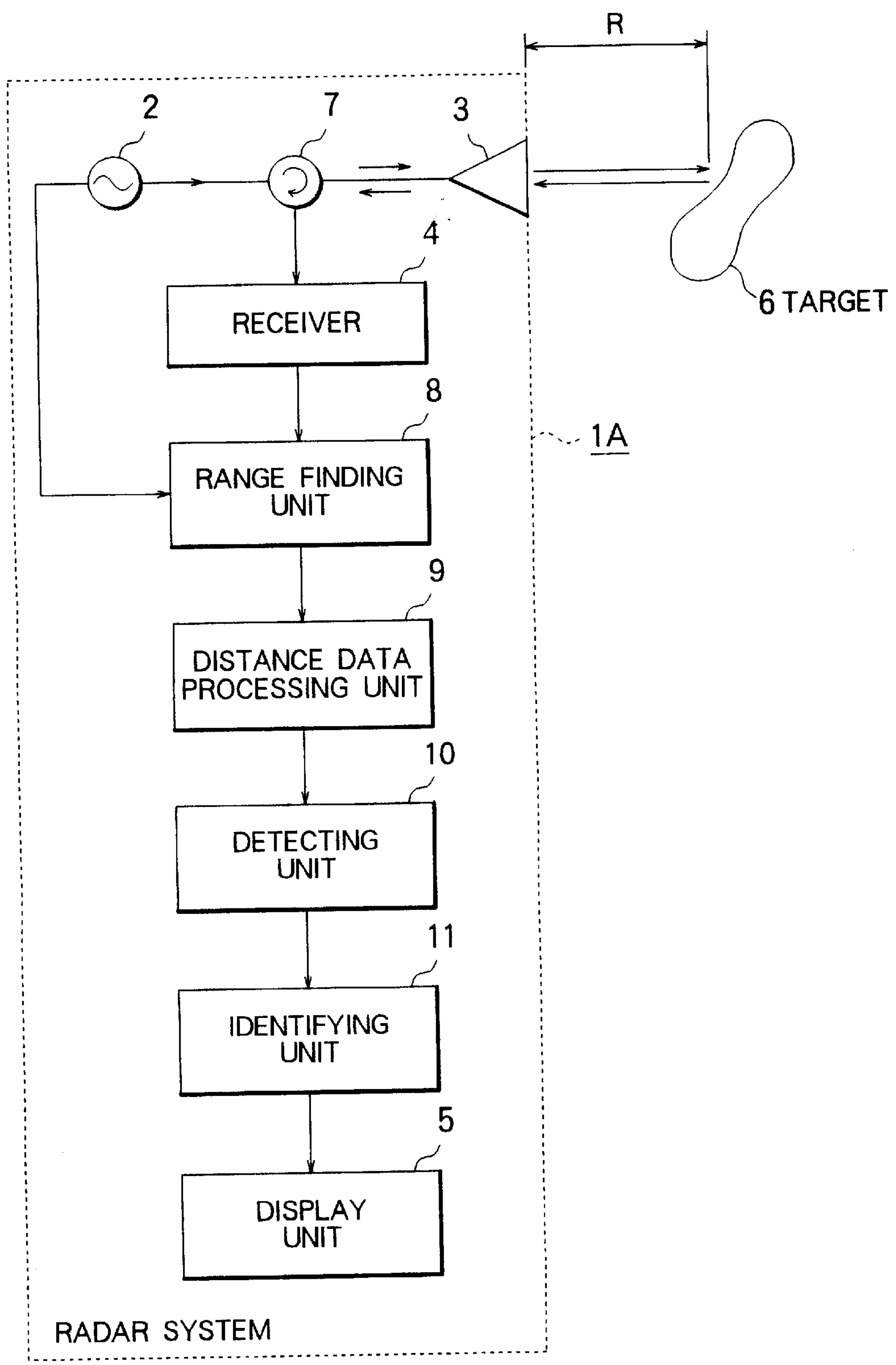
FIG. 1 is a schematic block diagram showing a configuration of a radar system according to a first embodiment of the present invention.

Now, the present invention will be described in detail in conjunction with what is presently considered as preferred or typical embodiments thereof by reference to the drawings. In the following description, like reference characters designate like or corresponding parts throughout the several views.

Embodiment 1

Figure 6:
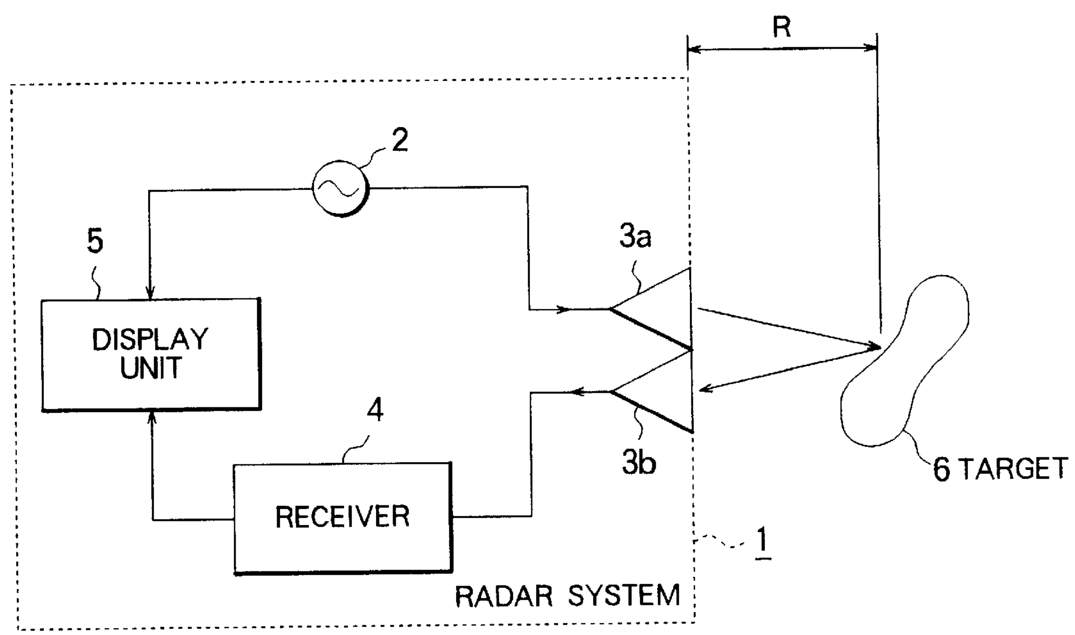
FIG. 6 is a schematic block diagram illustrating the principle underlying the range finding operation of a conventional radar system.

FIG. 1 is a schematic block diagram showing a radar system according to the first embodiment of the present invention. In the figure, like reference characters as those used in FIG. 6 denote like or equivalent components. The radar system denoted generally by reference numeral 1A is equipped with a unitary antenna 3 implemented in a single unit serving as a transmitting antenna 3*a* and a receiving antenna 3*b* in the conventional system, wherein a radio wave for transmission and a radio wave(s) reflected from a target or echoes as received via the unitary antenna 3 are separated one another by means of a circulator 7.

The radar system 1A further includes a range finding unit 8 for arithmetically determining a distance R intervening between the radar system and a target in accordance with the previously mentioned expression (1) upon every reception of echo by a receiver 4 with a time interval after the transmission of the radio wave from a transmitter 2 by measuring amplitude levels of the received radio waves or echoes corresponding to individual distances R for thereby generating distance data indicating relations between the distances and the amplitude levels of the received signal, a distance data processing unit 9 for extracting from the generated distance data a first set of distance data indicating the distances which bear an integral multiple relation to one another (hereinafter these distance data will also be referred to as the first distance data set), a detecting unit 10 for comparing the reception amplitude levels of the first distance data set as extracted with a predetermined threshold level S to thereby detect a second set of distance data each having the reception amplitude levels exceeding the threshold level S (hereinafter these distance data will also be referred to as the second distance data set), an identifying unit 11 for identifying discriminatively a first echo (i.e., radio wave resulting from a first reflection at the target) from multiple reflected waves resulting from multiple or secondary or repeated reflections between the rader system and the target, and a display unit 5 indicating a distance calculated on the basis of the time taken for the radio wave transmitted from the radar system and reflected at the target to be received by the receiver 4.

Next, operation of the radar system according to instant embodiment of the invention will be described by reference to FIGS. 2A to 2E.

Figure 2A:
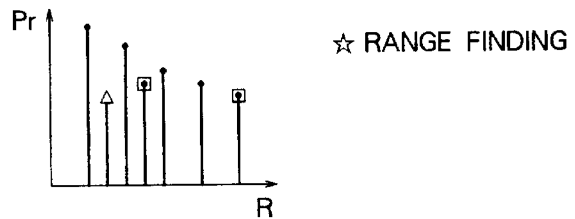
FIG. 2A is a view showing graphically distance data indicating relations between ranges and received amplitude levels as generated by a range finding unit shown in FIG. 1.

FIGS. 2A to 2D are views for illustrating the distance data and the distance data sets obtained through the processings performed by the range finding unit 8, the distance data processing unit 9, the detecting unit 10 and the identifying unit 11, respectively, of the radar system shown in FIG. 1. The range finding unit 8 arithmetically determines the ranges or distances R in accordance with the expression (1) mentioned previously upon every reception of the radio waves or echoes by the receiver 4 periodically at time intervals and fetches the reception amplitude levels Pr for every range or distance R to thereby generate the distance data indicating relations between the distances and the amplitude levels of the received echo signals, as can be seen in FIG. 2A. The distance data outputted from the range finding unit 8 contain mixedly the data determined on the basis of the first echo from the target 6 and multiple reflected waves due to multiple reflections of the radio wave between the radar system 1A and the target 6 and/or the first echo and multiple reflected waves from an obstacle or obstacles which may exist in addition to the target 6 of interest.

The distance data generated by the range finding unit 8 are inputted to the distance data processing unit 9 which extracts the first distance data set by detecting sequentially the distance data for the ranges or distances which bear an integral multiple relationship to the first or initial distance R. When one distance data set has been extracted from the distance data, then the distance data indicating the ranges or distances bearing integral multiple relationships to the distance differing from the preceding distance R are detected sequentially to thereby generate a second set of the distance data.

Figure 2B:
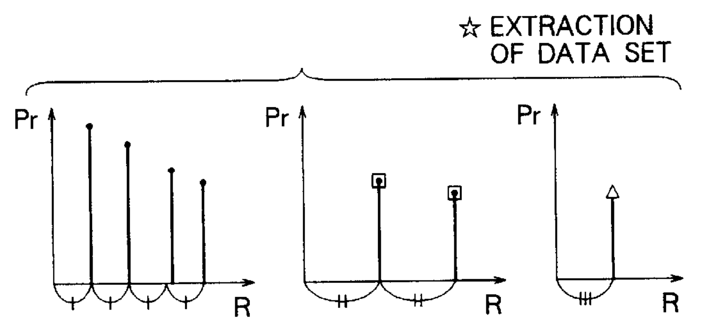
FIG. 2B is a view illustrating, by way of example only, three distance data sets extracted by a distance data processing unit constituting a part of the radar system shown in FIG. 1.

By repeating the procedure described above, the distance data set can be extracted. FIG. 2B shows, by way of example only, three distance data sets extracted by the distance data processing unit 9. More specifically, the three distance data sets are the set of distance data originating in the target 6, the set of distance data derived from the first echo and the multiple reflected waves from the target and the set(s) of distance data derived from the first echo(es) and the multiple reflected waves from obstacle(s), i.e., object(s) other than except for the target 6, respectively.

When the distance data sets have been generated, the detecting unit 10 compares the amplitude levels Pr of the received signals (i.e., levels of the first echo and the multiple reflected waves) with a predetermined threshold level S in a plurality of distance data sets, to thereby detect the set of distance data each of the amplitude levels Pr exceeding the threshold level S.

Figure 2C:
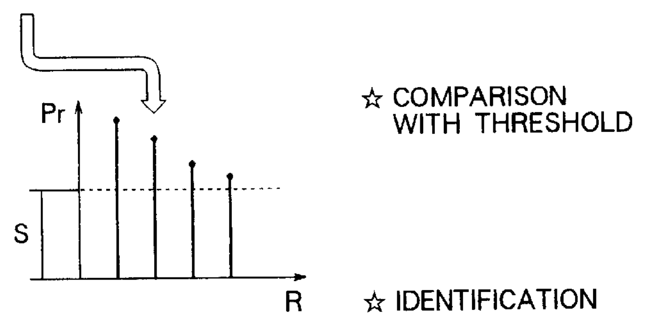
FIG. 2C is a view illustrating graphically comparison of radio wave amplitudes with a threshold level in a detecting unit constituting a part of the radar system shown in FIG. 1.

In general, the first echo from a near target 6 which is located relatively close to the radar system 1A may cause a higher reception amplitude level in the receiver 4 due to a short distance between the radar system and the target when compared with that of the first echo from a distant target. In that case, the first echo mentioned will undergo repeated reflection at the radar system 1A to be transmitted toward the target 6, which will result in the secondary or multiple reflected waves. In this conjunction, it will be appreciated that in the multiple reflected waves succeeding to the first echo (primary reflected wave), the electromagnetic energy of the radio wave is gradually attenuated in the course of plural reflections of the radio wave between the radar system 1A and the target 6, which results in gradual lowering of the amplitude level Pr of the received signal. Accordingly, by selecting properly or appropriately the threshold level S to be set in the detecting unit 10, it is possible to detect the presence of the secondary or multiple reflected waves between the radar system 1A and the target 6, as can be seen in FIG. 2C.

When the presence of the multiple reflected waves is detected by the detecting unit 10 as described above, the set of distance data having the amplitude level Pr exceeding the threshold level S is inputted from the detecting unit 10 to the identifying unit 11 which then identifies the first echo from the target 6 indicating a real image thereof from false echo images represented by the multiple reflected waves.

Figure 2D:
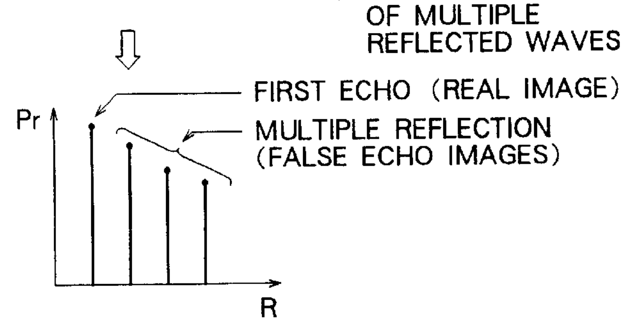
FIG. 2D is a view for illustrating operation of an identifying unit of the radar system shown in FIG. 1.

The distances determined on the basis of the multiple reflected waves bear integral multiple relations to the distance determined on the basis of the first echo which precedes to the multiple reflected waves, as can be seen in FIG. 2D. Accordingly, upon detection of the distance represented by the distance data derived from the first echo and the distances bearing the integral multiple relation to the former in the distance data set, it can then be decided that the distance data making appearance with the integral-multiple-distance relations to the distance data based on the first echo are ascribable to the multiple reflected waves.

Figure 2E:
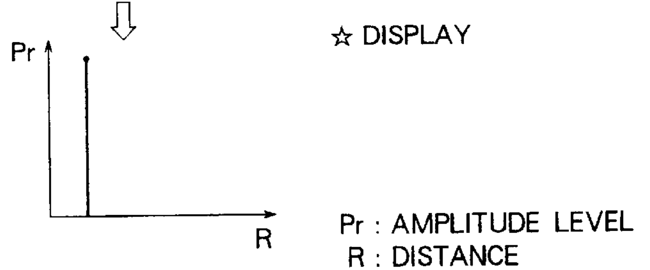
FIG. 2E is a view showing a distance to a target as determined on the basis of the first echo and displayed on a display unit of the system shown in FIG. 1.

When the multiple reflected waves are identified discriminatively in the distance data set, the only distance data determined on the basis of the first echo can be displayed in the display unit 5 through appropriate signal processing, as shown in FIG. 2E, by eliminating the distance data determined based on the multiple reflected waves from the distance data set. In this way, in the radar system according to the instant embodiment of the present invention, only the distance to the target 6 that is determined on the basis of the first echo can be selectively displayed while suppressing the influences of the multiple reflections of the radio wave at the near target.

Embodiment 2

In the radar system according to the first embodiment of the invention, the threshold level S is set to a single value for detecting the multiple reflected waves from the distance data set. However, in the case of the radar system imparted with the function for performing the range finding operation repetitionally by sending out the radio wave repetitively, there may be encountered such situation that the reception amplitude levels of the distance data set obtained by the current range finding operation change from the received amplitude levels of the distance data set obtained in the preceding range finding operation. By way of example, the amplitude levels of the first echo and the multiple reflected waves in the current range finding operation may become lower than the amplitude levels in the preceding range finding operation. In that case, it is preferred to lower the threshold level S to be set currently when compared with the threshold level S employed in the preceding range finding operation in order to separate or identify discriminatively the first echo from the multiple reflected waves on the basis of the relevant distance data sets with high accuracy.

Figure 3A:
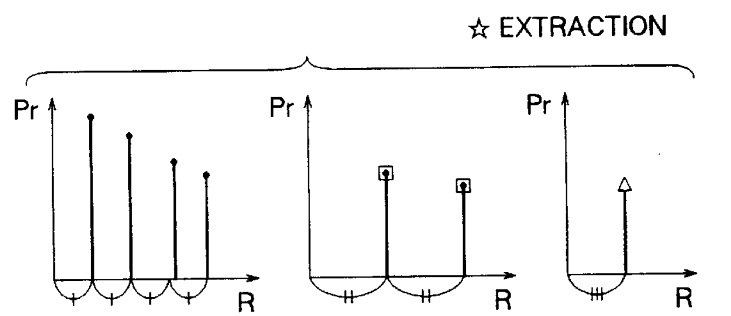
FIG. 3A is a view for illustrating operation of a distance data processing unit of the radar system according to a second embodiment of the invention.
Figure 3B:
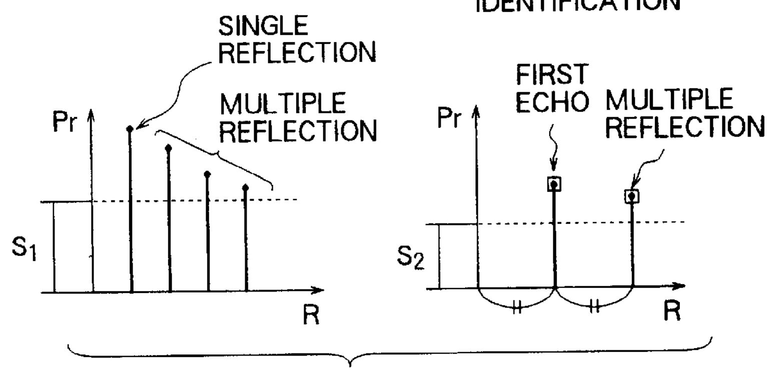
FIG. 3B is a view for graphically illustrating operations of a detecting unit and an identifying unit of the radar system according to the second embodiment of the invention.
Figure 3C:
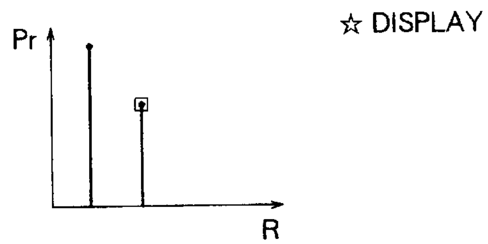
FIG. 3C is a view showing a distance to a target as determined and displayed on the display unit of the radar system according to the second embodiment of the invention.
Figure 4:
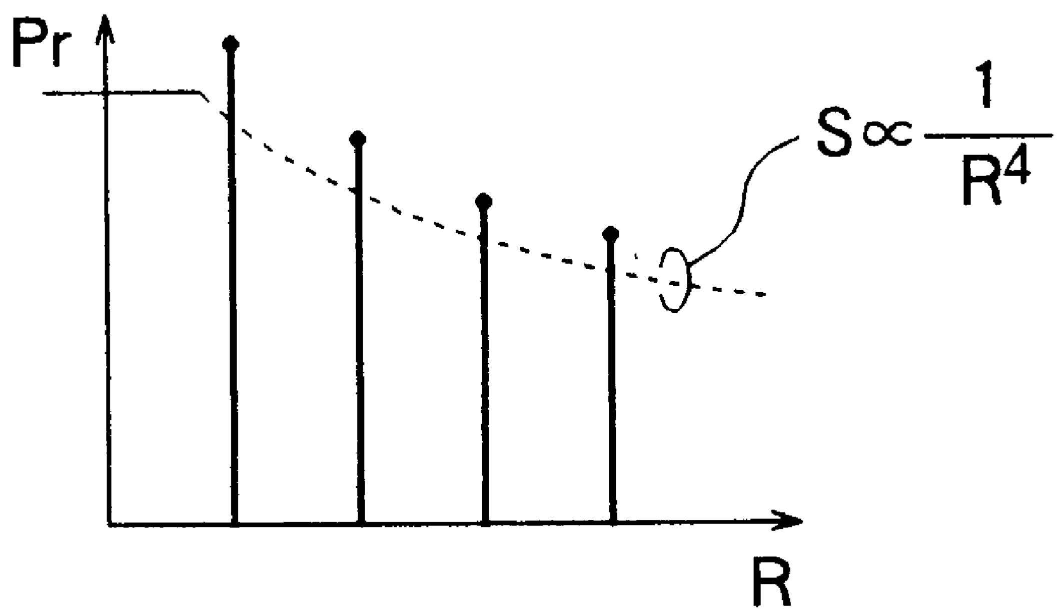
FIG. 4 is a view illustrating relation between distances to a target and reception amplitude levels in a detecting unit of the radar system according to a third embodiment of the present invention.

FIGS. 3A to 3C are views illustrating operation of the radar system according to the instant embodiment of the invention. In the figure, components like as or equivalent to those described hereinbefore by reference to FIGS. 2A to 2E are designated by like reference characters. At first, when distance data sets have been extracted by the distance data processing unit 9 in the similar manner as the case of the radar system according to the first embodiment, as can be seen in FIG. 3A, the detecting unit 10 compares the reception amplitude levels Pr with a predetermined threshold level $S_1$ in the distance data sets to thereby detect a set of distance data each having the reception amplitude level Pr exceeding the threshold level $S_1$.

By selecting appropriately the threshold level $S_1$ to be set at the detecting unit 10, it is possible to detect the presence of the multiple reflected waves between the radar system 1A and the target 6, as can be seen in FIG. 3B. When the presence of the multiple reflected waves is detected, the set of distance data having the respective reception amplitude levels Pr exceeding the threshold level $S_1$ are inputted to the identifying unit 11 from the detecting unit 10, whereupon the identifying unit 11 identifies discriminatively the first echo from the multiple reflected waves in the distance data set.

Furthermore, when the distance data processing unit 9 extracts a set of distance data set in the second range finding operation and when the reception amplitude levels Pr of the distance data obtained by the second range finding operation are, for example, lower when compared with the reception amplitude levels Pr of the distance data obtained by the preceding range finding operation, the detecting unit 10 sets a threshold level $S_2$ which is lower than the threshold level $S_1$ as set for the preceding distance data set.

By selecting the threshold level $S_2$ to be set up in the detecting unit 10, it is possible to detect the presence of the multiple reflected waves between the radar system 1A and the target 6, even if the reception amplitude levels Pr of the distance data are low, as is illustrated in FIG. 3B. When the presence of the multiple reflected waves is detected, the set of distance data having the reception amplitude level Pr exceeding the threshold level $S_2$ is inputted to the identifying unit 11 from the detecting unit 10, whereon the identifying unit 11 identifies discriminatively the first echo from the multiple reflected waves from the target 6 in the distance data set obtained by the second range finding.

In the above description, it has been assumed that the distance between the radar system 1A and the target 6 increases in the second range finding operation of the radar system and thus the threshold level S is set at a lower value. It goes, however, without saying that the distance between the radar system 1A and the target 6 may decrease in the second range finding operation and in that case the threshold level S can set higher for the distance data set. By setting the threshold level S variably in dependence on the magnitude of the amplitude levels of the distance data sets obtained in the range finding operation performed repetitionally, it is possible to separate the first or primary echo and the multiple reflected waves from each other with high accuracy in every range finding operation.

Embodiment 3

In the case of the radar system according to the first and second embodiments, the threshold level S is set at a constant value regardless of change in the reception amplitude level Pr in the distance data set. According to the teaching of the invention incarnated in a third embodiment thereof, it is proposed that the threshold level S is decreased curvilinearly in consideration of lowering of the reception amplitude level Pr in the distance data set as extracted.

In general, there applies valid the under mentioned radar equation (2) between the reception amplitude level Pr of the echo signal received by the radar system and the distance R to the target. Namely, $$Pr=(Pt\cdot Gt\cdot Gr\cdot \lambda^2\cdot \sigma)/((4\pi)^3\cdot R^4) \quad (2)$$

where Pt represents a transmission power, Gt represents gain of the transmitting antenna, Gr represents gain of the receiving antenna, $\lambda$ represents wavelength of the radio wave in the free space, and $\sigma$ represents the radar cross-section of the target.

As is apparent from the expression (2), the reception amplitude level Pr is in ineverse proportion to fourth power of the distance R to the target 6 for given values of the radio wave frequency ($\lambda$), transmission power Pt and the gain Gt of the transmitting antenna 3*a* and the gain Gr of the receiving antenna 3*b* of the unitary antenna 3. Accordingly, the threshold level S employed in the detecting unit 10 is changed curvilinearly in accordance with the expression (2).

In this case, the detecting unit 10 is so designed as to compare the reception amplitude level Pr with the threshold level S changing curvilinearly for each of the data in the distance data set outputted from the distance data processing unit 9. By virtue of the above arrangement, the first or primary echo and the multiple reflected waves from the target can be separated from each other with enhanced accuracy even for the distance data of the reception amplitude level lowered due to plural reflections of the radio wave between the target and the radar system.

Embodiment 4

In the radar system described hereinbefore in conjunction with the first to third embodiments, the identifying unit 11 is so designed as to identify discriminatively the first or primary echo and the multiple reflected waves originating in one and the same target 6 by taking advantage of the fact that distances of one or more false echo images based on the multiple reflected waves correspond to integral multiples, respectively, of the distance of the real image based on the first echo. However, in the case where a plurality of obstacles which might be erroneously recognized as the target 6 are present in the radio wave transmitting direction, it is difficult to determine without fail that the first echo and the succeeding multiple reflected waves detected with time intervals originate in one and the same target 6 only on the basis of the integral-multiple-relation between the first echo and the multiple reflected waves.

The fourth embodiment of the present invention is directed to such arrangement of the radar system which transmits the radio wave repetitionally at a predetermined time interval to the target 6 existing among a plurality of obstacles and which can identify discriminately the first echo and the multiple reflected waves originating in one and the same target 6 with enhanced reliability by arithmetically determining whether or not the distances between the real image determined on the basis of the first echo and one or more false echo images determined as based on the multiple reflected waves from the target 6 decreases while maintaining the integral multiple relation mentioned previously independent of the time lapse (e.g. as in the case where the target is moving toward the radar system).

Figure 5:
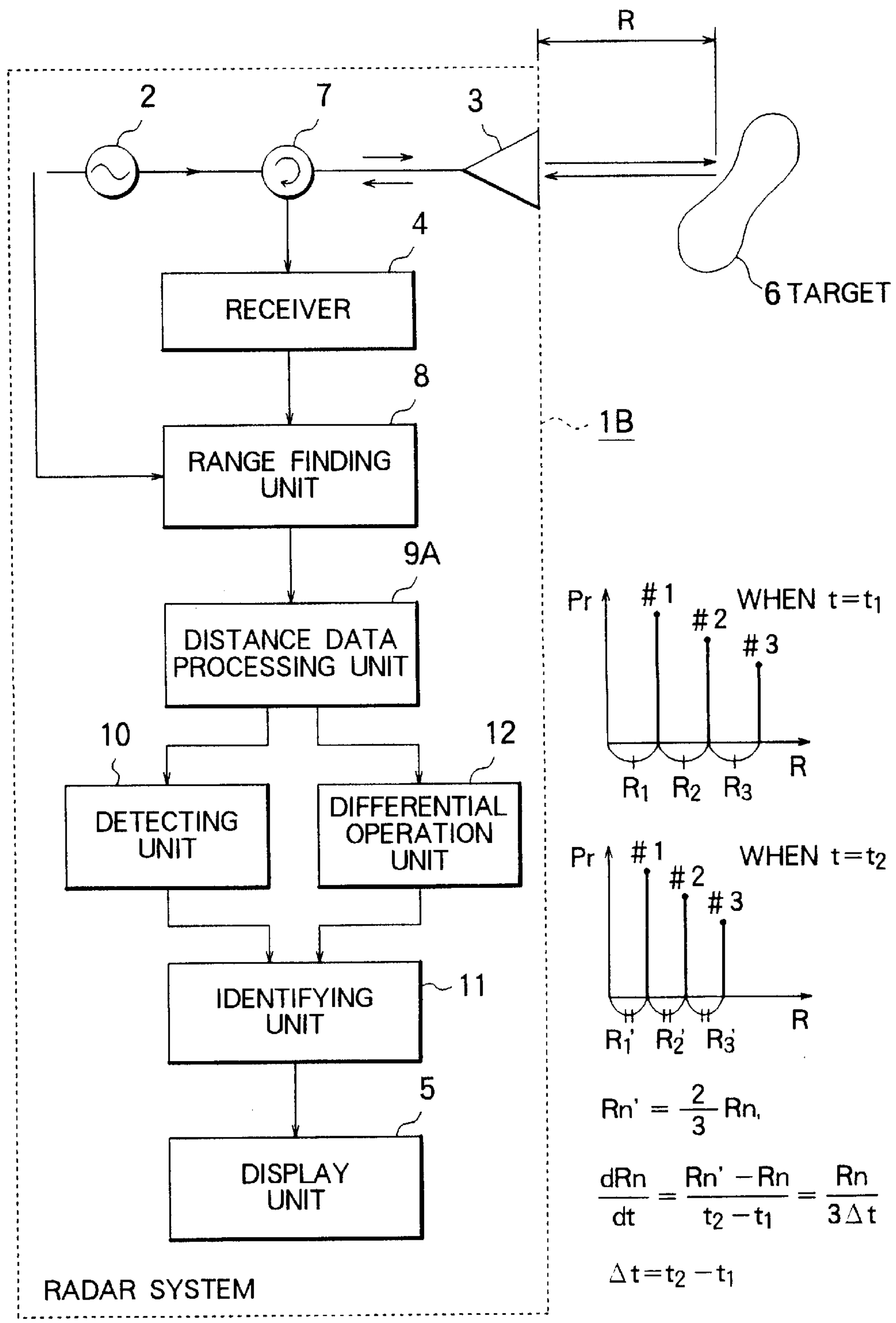
FIG. 5 is a schematic block diagram showing a radar system according to a fourth embodiment of the present invention.

Now, the description will be directed to the radar system according to the fourth embodiment of the invention. FIG. 5 is a schematic block diagram showing a radar system according to the fourth embodiment of the present invention. In the figure, like reference characters as those used in FIG. 1 denote like or equivalent components. In FIG. 5, reference character 9A indicates a distance data processing unit which is so designed as to store regularly on a time-serial basis the sets of distance data extracted at every time point.

As is seen in FIG. 5, the radar system according to the instant embodiment of the invention includes a differential operation unit 12 for determining rates of changes ($dR_1=R'_1-R_1$, $dR_2=R'_2-R_2$, $dR_3=R'_3-R_3$) distances $R_1$, $R_2$ and $R_3$, respectively, in the distance data set upon change in time from $t_1$ to $t_2$, i.e., time differential coefficients of the distances $R_1$, $R_2$ and $R_3$, respectively. When one and the same target moves in the direction toward the radar system, the rate of changes of the distances per unit time (i.e., ($dR_1=R'_1-R_1$, $dR_2=R'_2-R_2$, $dR_3=R'_3-R_3$)) are in proportion to the distances or ranges $R_1$, $R_2$ and $R_3$, respectively. In the radar system according to the instant embodiment of the invention, the distances $R_1$, $R_2$ and $R_3$ are so set that they should decrease by ⅔ as a function of the time lapse.

Operation of the radar system according to the instant embodiment of the invention will now be described.

When the radar system 1B is so implemented as to be capable of transmitting repetitionally the radio wave toward the target 6 for performing repetitionaLly the range finding operation, the differential operation unit 12 fetches from the distance data processing unit 9A the distance data sets stored time-serially at the time points $t_1$ and $t_2$, respectively. Subsequently, the differential operation unit 12 reads out the distances sequentially from the distance data sets to thereby determine arithmetically n time differential coefficients $dR_n/dt(dR_1/dt, dR_2/dt, dR_3/dt, \ldots dR_n/dt)$ for the n distances $R_n$ $(dR_{1=R'1}-R_1, dR_2=R'_2-R_2, dR_3=R'_3-R_3 \ldots dR_n=R'_1-R_n)$ in the sequential order.

When the predetermined distance data set outputted from the distance data processing unit 9A contains the first echo and the multiple reflected waves originating in one and the same target, each of the time differential coefficients $dR_n/dt(dR_1/dt, dR_2/dt, dR_3/dt, \ldots dR_n/dt)$ derived for the n distance data available from the output of the differential operation unit 12 may be represented by $-R_n/(3\Delta t)$, where $\Delta t=t_2-t_1$. This means that the distance between the radar system and the target 6 decreases by ⅓ from the distance at the time point $t_1$ due to the time lapse $\Delta t$. In this conjunction, it is to be mentioned that when the target 6 is moving away from the radar system 1B, the aforementioned time differential coefficient assumes a positive or plus value. On the other hand, when the time differential coefficient is zero "0", the relative distance between the radar system 1B and the target 6 is maintained to be constant regardless of the time lapse $\Delta t$. Additionally, by differentiating the time differential coefficient, the rate of change in the moving speed of the target can also be determined or measured.

The foregoing description of the fourth embodiment has been made on the assumption that for a single target, the time differential coefficients of the n distances are the same value nevertheless the changing of the distance $R_n$. However, when the first echo and the multiple reflected waves from the plural targets are contained in the distance data set, the time differential coefficients $dR_n/dt$ may be classified into several groups for the time differential coefficients $dR_n/dt$ of equal value at which the relative speed between the radar system and the target is constant. The set of distance data for which the time differential coefficients are same can be regarded as being ascribable to the first echo or the multiple reflected waves from one and the same target.

In the identifying unit 11, the first echo and the multiple reflected waves from the target 6 are discriminatively identified on the basis of the time differential coefficients of the distance obtained by the differential operation unit 12 and the data of the multiple reflected waves detected with the aid of the threshold level S for the received amplitude level obtained by the detecting unit 10.

Thus, even when the multiple reflected waves from a plurality of targets are received, the first echoes from these plural targets can be detected discriminatively with high accuracy.

In this conjunction, it is to be noted that the description of each previous embodiments are based on the assumption that the radar system is a stationary radar system for finding range or distance to a mobile target. However, this is only by way of example and the invention can equally be implemented as a mobile radar system installed on a motor vehicle, ship, aircraft and the like, to similar effects.

Many modifications and variations of the present invention are possible in the light of the above techniques. It is therefore to be understood that within the scope of the appended claims, the invention may be practiced otherwise than as specifically described.

What is claimed is:

1. A radar system, comprising:

range finding means for measuring amplitude levels of received signals upon every reception of reflected waves from a target after transmission of a radio wave toward said target and determining arithmetically individual distances to said target on the basis of times lapsed from transmission of said radio wave to the reception of said reflected waves, to thereby generate distance data indicating relations between said distances and said amplitude levels, respectively;

distance data processing means for extracting from said generated distance data sets a set of distance data indicating the distances which bear an integral multiple relation to one another;

detecting means for comparing said amplitude levels for the individual distance data of said sets with a predetermined threshold level to thereby detect distance data each having the amplitude levels exceeding said threshold level; and identifying means for identifying discriminatively on the basis of said detected distance data a real image indicated by a first echo from said target and false echo images indicated by succeeding multiple reflected waves reflected repeatedly between said transmitting means and said target.

2. A radar system according to claim 1, wherein in said detecting means, said threshold level is set to be variable.

3. A radar system according to claim 2, wherein in said detecting means, said threshold level is set to be variable in accordance with reception amplitude levels of the preceding distance data detected up to the preceding range finding operation.

4. A radar system according to claim 2, wherein in said detecting means, said threshold level is so set as to change continuously in correspondence to change of the distance in the distance data set extracted.

5. A radar system according to claim 1, further comprising:

differential operation means for fetching from said distance data processing means distance data sets at every time point at which the radio wave is transmitted toward said target repetitionally and determining differential coefficients by time differentiation of distances represented by said distance data; and identifying means for identifying discriminatively those of said differential coefficients which are in proportion to said distances, respectively, as distance data based on the first echo and the multiple reflected waves from a same target.

* * * * *